(12) United States Patent
Mantel et al.

(10) Patent No.: US 7,912,907 B1
(45) Date of Patent: Mar. 22, 2011

(54) SPAM EMAIL DETECTION BASED ON N-GRAMS WITH FEATURE SELECTION

(75) Inventors: Eli Mantel, Palo Alto, CA (US); Sanford Jensen, Berkeley, CA (US)

(73) Assignee: Symantec Corporation, Mountain View, CA (US)

( * ) Notice: Subject to any disclaimer, the term of this patent is extended or adjusted under 35 U.S.C. 154(b) by 1279 days.

(21) Appl. No.: 11/246,876

(22) Filed: Oct. 7, 2005

(51) Int. Cl.
  *G06F 15/16* (2006.01)
  *G06N 7/02* (2006.01)
(52) U.S. Cl. .......................................... 709/206; 706/52
(58) Field of Classification Search .................. 709/206; 706/52; 707/780
  See application file for complete search history.

(56) References Cited

U.S. PATENT DOCUMENTS

| | | | |
|---|---|---|---|
| 6,167,434 | A | 12/2000 | Pang |
| 6,249,807 | B1 | 6/2001 | Shaw et al. |
| 6,282,565 | B1 | 8/2001 | Shaw et al. |
| 6,289,416 | B1 | 9/2001 | Fukushima et al. |
| 6,324,569 | B1 | 11/2001 | Ogilvie et al. |
| 6,487,586 | B2 | 11/2002 | Ogilvie et al. |
| 6,493,007 | B1 | 12/2002 | Pang |
| 6,546,416 | B1 | 4/2003 | Kirsch |
| 6,640,301 | B1 | 10/2003 | Ng |
| 6,643,685 | B1 | 11/2003 | Millard |
| 6,650,890 | B1 | 11/2003 | Irlam et al. |
| 6,654,787 | B1 | 11/2003 | Aronson et al. |
| 6,687,740 | B1 | 2/2004 | Gough |
| 6,691,156 | B1 | 2/2004 | Drummond et al. |
| 6,697,942 | B1 | 2/2004 | L'Heureux |
| 6,701,347 | B1 | 3/2004 | Ogilvie |
| 6,711,608 | B1 | 3/2004 | Ogilvie |
| 6,732,157 | B1 | 5/2004 | Gordon et al. |
| 6,757,713 | B1 | 6/2004 | Ogilvie et al. |
| 6,757,830 | B1 | 6/2004 | Tarbotton et al. |
| 7,272,853 | B2 * | 9/2007 | Goodman et al. ............... 726/13 |
| 7,421,498 | B2 * | 9/2008 | Packer .......................... 709/225 |
| 2002/0087641 | A1 | 7/2002 | Levosky |
| 2002/0138581 | A1 | 9/2002 | MacIntosh et al. |
| 2003/0149726 | A1 | 8/2003 | Spear |
| 2003/0167311 | A1 | 9/2003 | Kirsch |
| 2003/0191969 | A1 | 10/2003 | Katsikas |

(Continued)

OTHER PUBLICATIONS

Nicholas et al. ("Spotting Topics with the Singular Value Decomposition", 1998, http://www.springerlink.com/content/pmnxa3681qurn1gq/, pp. 82-91).*

(Continued)

*Primary Examiner* — George C Neurauter, Jr.
*Assistant Examiner* — Mark Pfizenmayer
(74) *Attorney, Agent, or Firm* — Fenwick & West LLP

(57) ABSTRACT

A similarity measurement manager uses n-gram analysis to identify spam email messages. The similarity measurement manager tokenizing an email message into a plurality of overlapping n-grams, wherein n is large enough to identify uniqueness of artifacts. The similarity measurement manager employs feature selection by comparing the created n-grams to n-grams of known artifacts which were created according to the same methodology. Created n-grams that match an n-gram of a known artifact are ignored. The similarity measurement manager compares the remaining created n-grams to pluralities of n-grams of known spam email messages, the n-grams of the known spam email messages being themselves created by executing the same steps. The similarity measurement manager determines whether the email message comprises spam based on whether or not the n-gram comparison indicates that it is substantially similar to a known spam email message.

19 Claims, 1 Drawing Sheet

U.S. PATENT DOCUMENTS

| | | | |
|---|---|---|---|
| 2003/0200334 | A1 | 10/2003 | Grynberg |
| 2003/0220978 | A1 | 11/2003 | Rhodes |
| 2003/0229672 | A1 | 12/2003 | Kohn |
| 2003/0233415 | A1 | 12/2003 | Beyda |
| 2004/0003283 | A1 | 1/2004 | Goodman et al. |
| 2004/0024823 | A1 | 2/2004 | Del Monte |
| 2004/0054887 | A1 | 3/2004 | Paulsen et al. |
| 2004/0064734 | A1 | 4/2004 | Ehrlich |
| 2004/0068534 | A1 | 4/2004 | Angermayr et al. |
| 2004/0073617 | A1 | 4/2004 | Milliken et al. |
| 2004/0093383 | A1 | 5/2004 | Huang et al. |
| 2004/0093384 | A1 | 5/2004 | Shipp |
| 2004/0111480 | A1 | 6/2004 | Yue |
| 2004/0148358 | A1 | 7/2004 | Singh et al. |
| 2004/0205173 | A1 | 10/2004 | Hall |
| 2005/0262210 | A1* | 11/2005 | Yu ............... 709/206 |
| 2006/0031346 | A1* | 2/2006 | Zheng et al. ....... 709/206 |
| 2006/0149820 | A1* | 7/2006 | Rajan et al. ....... 709/206 |
| 2006/0218115 | A1* | 9/2006 | Goodman et al. ....... 707/1 |

OTHER PUBLICATIONS

CAUSE.org web pages [online] Coalition Against Unsolicited Commercial Email [retrieved Mar. 17, 2003] Retrieved from the Internet: <URL: http://www.cauce.org/about/problem.shtml> U.S.A.

Outlook.spambully.com web pages [online] Spam Bully [retrieved Jan. 16, 2003] Copyright 2002, Retrieved from the Internet <URL: http://outlook.spambully.com/about.php>.

NBEC/NWOCA Anti-Spam Tools, [online] [retrieved Jul. 7, 2004] retrieved from http://home.nwoca.org, Ohio, U.S.A., Jul. 7, 2004.

Kularski, C. "Compound Procedures for Spam Control," Highland School of Technology, Gastonia, NC, U.S.A., Jan. 2004.

"Technical Responses to Spam," Nov. 2003, Taughannock Networks, Trumansburg, New York, U.S.A.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.letsug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

* cited by examiner

US 7,912,907 B1

SPAM EMAIL DETECTION BASED ON N-GRAMS WITH FEATURE SELECTION

TECHNICAL FIELD

This invention pertains generally to computer security, and more specifically to n-gram based identification of spam email messages.

BACKGROUND

Spam and e-mail carrying malicious attachments (e.g., viruses, worms, etc.) are a serious computer security problem. Batches of spam are often sent out in mass, frequently with slight variations, either in order to defeat spam filters or as a result of product or transmission particulars and the like. Once a specific spam email message has been identified, it would be useful to be able to detect similar messages that are not identical, but are part of the same spam attack.

A known method for determining general document similarity involves extracting n-grams from the documents in question, comparing the n-grams, and determining the percentage of n-grams that the documents have in common.

Feature selection is one way to improve the similarity calculation. One approach to feature selection is to eliminate parts of the document that are not considered to be useful for the purpose of comparing messages. A common form of feature selection is to use a list of "stop words," such as "the" "and" "or," and similar very common words that are found across documents. By eliminating such words from the comparison, a more useful measure of document similarity can be made.

However, in the special case of spam email messages, the features that it is desirable to eliminate are likely not to be a simple list of common words, but artifacts of how the message was produced or transmitted, including both text and graphical artifacts. To the extent that such artifacts are present in email messages and become part of the set of features compared, they result in a less useful similarity measure. This results in an increased likelihood of false positives.

What is needed are methods, systems and computer readable media for determining email messages similarity, taking into account the specialized feature selection inherent in the case of email messages.

SUMMARY OF INVENTION

Computer-implemented methods, computer systems and computer-readable media use n-gram analysis to identify spam email messages. A similarity measurement manager tokenizes an email message into a plurality of overlapping n-grams, wherein n is large enough to identify uniqueness of artifacts (e.g., n equals eight). The similarity measurement manager employs feature selection by comparing the created n-grams to n-grams of known artifacts which were created according to the same methodology. Created n-grams that match an n-gram of a known artifact are ignored. The similarity measurement manager compares the remaining created n-grams to pluralities of n-grams of known spam email messages, the n-grams of the known spam email messages being themselves created by executing the same tokenizing and feature selection.

Responsive to a threshold percentage of the remaining created n-grams matching a plurality of n-grams of a known spam email message, the similarity measurement manager concludes that the email message comprises spam. On the other hand, if a threshold percentage of the remaining created n-grams does not match a plurality of n-grams of any known spam email message, the similarity measurement manager concludes that the email message does not comprise spam.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
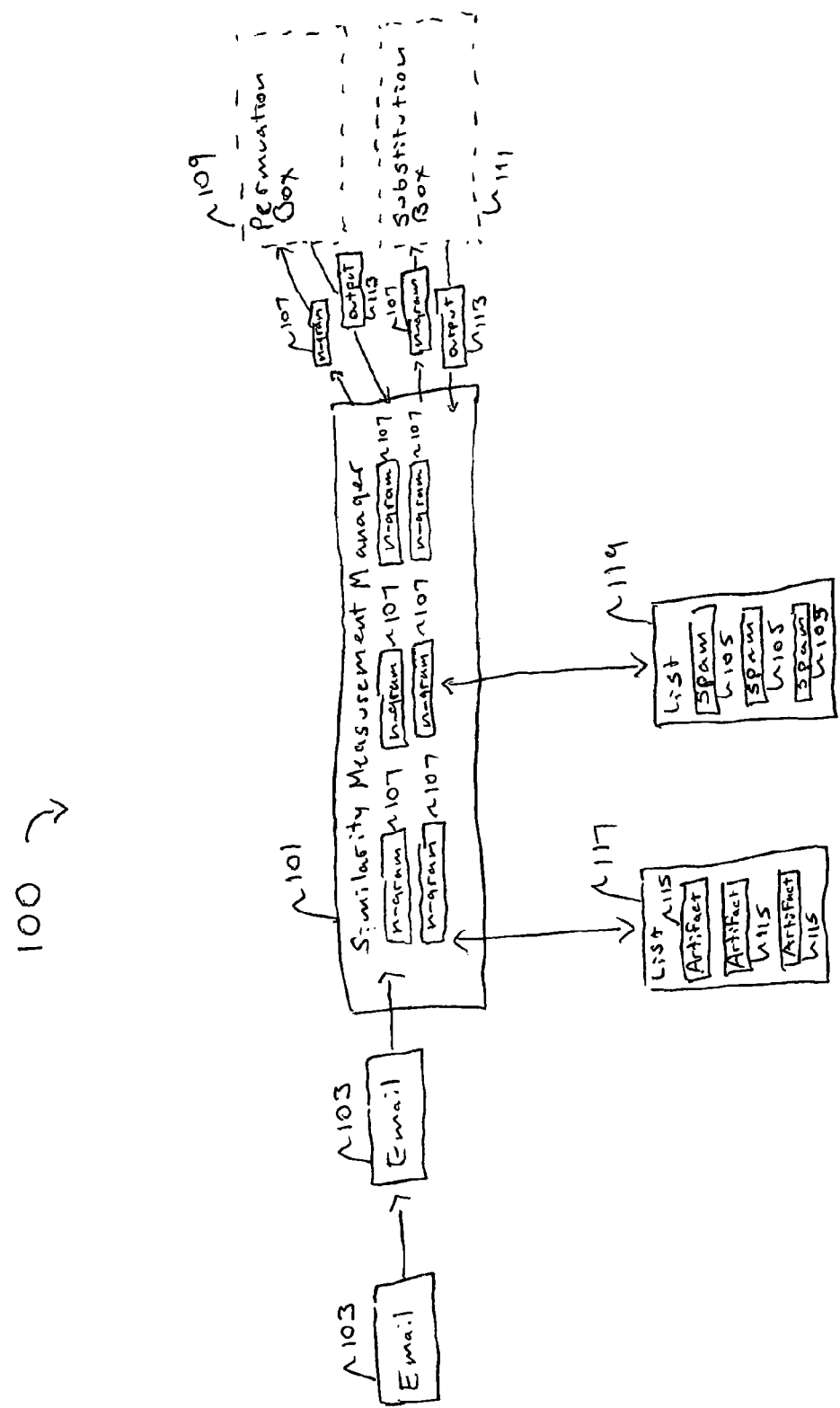
FIG. 1 is a block diagram illustrating a high level overview of a system for performing n-gram based identification of spam email messages using feature exclusion, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a high level overview of a system 100 for practicing some embodiments of the present invention. A similarity measurement manager 101 uses n-gram analysis to determine whether email messages 103 comprise spam 105. It is to be understood that although the similarity measurement manager 101 is illustrated as a single entity, as the term is used herein a similarity measurement manager 101 refers to a collection of functionalities which can be implemented as software, hardware, firmware or any combination of these. Where a similarity measurement manager 101 is implemented as software, it can be implemented as a standalone program, but can also be implemented in other ways, for example as part of a larger program, as a plurality of separate programs, as one or more device drivers or as one or more statically or dynamically linked libraries. In one embodiment, the software program is stored on a non-transitory computer readable storage medium.

The similarity measurement manager 101 tokenizes an email message 103 into a set of overlapping n-grams 107. In some embodiments of the present invention, the similarity measurement manager 101 creates character-level n-grams 107 (e.g., for text) or byte-level n-grams 107 (e.g., for all data). Character-level and byte-level n-grams 107 (as distinguished from word-level n-grams 107) are useful in this context, as they eliminate the issue of having to define word boundaries, which can be problematic in some languages.

In some embodiments, instead of contributing the full eight bits (or more than eight in character-level n-gram 107 embodiments in cases of multi-byte character encodings), the similarity measurement manager 101 utilizes a smaller number of bits from each character to create the corresponding n-gram 107. For example, in an embodiment in which n equals eight, the similarity measurement manager 101 could use the low order four bits from each character, resulting in each n-gram 107 mapping to a 32 bit value.

Many different combinations of numbers of bytes/characters and total number of bits can be used, as desired. The values of 32 bits and eight characters are an example that works well for spam 105 detection, but different combinations of numbers of characters and total number of bits are used in other embodiments, and achieve the same general result.

In some embodiments, to eliminate any likelihood of undesirable clusters of values showing up in the message fingerprint, the similarity measurement manager 101 inputs the n-grams 107 created from an email message 103 into a permutation box 109 or into a substitution box 111, thereby producing a highly-scrambled bit output 113. The similarity measurement manager 101 then utilizes the output 113 of the permutation 109 or substitution box 111 to compare to pluralities of n-grams 107 of artifacts and/or known spam email messages 105 (as described below), wherein those n-grams 107 have themselves been passed through a permutation 109 or substitution box 111.

The similarity measurement manager 101 compares the created n-grams 107 to n-grams 107 of known artifacts 115, and ignores any created n-grams 107 that match an n-gram 107 of a known artifact 115. This elimination of artifacts 115 is known as "feature exclusion" or "feature selection." This way, artifacts 115 in email messages 103 are not included in the subsequent comparison with known spam messages 105, and the comparison is based on substantive content only. In some embodiments of the present invention, the similarity measurement manager 101 maintains a list 117 of known artifacts 115 (or n-grams 107 thereof), which it can assemble from its own email 103 analysis or according to other methodologies as desired. In other embodiments, known artifacts 115 are provided by a remote (or local) external component.

The similarity measurement manager 101 compares the remaining created n-grams 107 to pluralities of n-grams 107 of known spam email messages 105, the n-grams 107 of the known spam email messages 105 being themselves created by the same process, including feature selection against the same artifact set 115. The similarity measurement manager 101 determines whether the email message 103 comprises spam 105 based on results of this second comparison. If a threshold percentage of the remaining created n-grams 107 match a plurality of n-grams 107 of a known spam email message 105, the similarity measurement manager 101 concludes that the email message 103 comprises spam 105. On the other hand, responsive to a threshold percentage of the remaining created n-grams 107 not matching a plurality of n-grams 107 of any known spam email message 105, the similarity measurement manager 101 concludes that the email message 103 does not comprise spam 105. Of course, the exact threshold percentage to use is a variable design parameter, which can be adjusted up or down based on the level of precision desired. As with artifacts 115, in some embodiments of the present invention, the similarity measurement manager 101 maintains a list 119 of known spam email messages 105 (or sets of n-grams 107 thereof), whereas in other embodiments, known spam messages 105 are provided by an external component.

Some examples of n-gram 107 based spam 105 detection with and without feature selection will clarify certain properties of some embodiments of the present invention. For an example of such processing without feature selection, imagine attempting to determine whether the following (legitimate) email message 103 comprises the following spam message 105 based on n-gram analysis without feature selection.

Legitimate email message 103:
Thanks for your help. Later.
Do you Yahoo!?
Yahoo! Mail—Find what you need with new enhanced search.
Spam email message 105:
See me naked sexworld.com
Do you Yahoo!?
Yahoo! Mail—Find what you need with new enhanced search.

The spam message 105 above has 102 characters. After standard n-gram 107 preprocessing, this is reduced to 72 characters, with a total of 65 generated n-grams 107 (in an embodiment with 32 bit n-grams 107 as described above). The legitimate message 103 has 104 characters. After preprocessing, this is reduced to 74 characters, with a total of 67 generated n-grams 107.

These two messages have a 52 character sequence (and thus 45 n-grams 107) in common, indicating a similarity level of about 68%. In some embodiments, 68% would be high enough to falsely flag the legitimate email 103 as spam 105.

However, by using feature exclusion as per the present invention, this false positive would be avoided. The 52-character sequence that the legitimate 103 and spam 105 messages have in common is in fact an artifact 115 of the messages being sent from Yahoo! email accounts, and not a part of the message text controlled by the sender. Had this sequence been identified as an artifact 115 and incorporated into the feature exclusion list 117, these two messages would have had only 20 and 22 n-grams 107 respectively after feature exclusion, and no common n-grams 107, thus correctly indicating a similarity level of zero.

For another example, consider attempting to determine whether received (spam) message A comprises known spam message B.
Spam message A:
Check out the "just turned 18" babes at hotteens.example.com
Do you Yahoo!?
Yahoo! Mail—Find what you need with new enhanced search.
Spam message B:
Check out the "just turned 18" babes at hotteens.example.com
Yahoo! Personals—Better first dates. More second dates.

In this case, the received message 105 is actually identical to the known spam message 105, but without feature exclusion, the similarity measured would be only 46% (36 out of 78 n-grams 107). Thus, spam message A would be falsely adjudicated to be legitimate. However, using feature selection as per the present invention, assuming that both tag lines are identified as artifacts 115 and are included in the exclusion list 117, these two spam messages 105 would have a similarity level of 84% (36 out of 42 n-grams 107), a significant improvement that should be sufficient to avoid the false negative By using a larger value for n (and hence a longer string) than what is used with typical character-level n-gram 107 analysis, the similarity measurement manager 101 can create n-grams 107 that provide a greater degree of uniqueness and greater context, increasing the likelihood that an excluded feature is actually related to an undesirable artifact 115 rather than distinguishing content. This is so even though each feature actually corresponds to a large set of character strings.

For example, in an implementation in which n equals eight and the four low order bits of an eight bit byte are used to create n-grams 107, a four bit value of "1001" (i.e. x'9') could come from a byte with value x09, x10, x29, ... xf9. The effect of this variation of possible inputs for each of the eight bytes means that each 32-bit value could have come from any one of 2^32 possible combinations of input bytes, but the large number of possible values makes the probability that the same 32-bit value occurs in another message due to chance very low. Of course, eight is just an example of a value to use for n for longer n-grams 107. Other values are also possible.

Without longer n-grams 107, it is more probable that feature exclusion will eliminate relevant features. For instance, given the two (spam) messages 105:

"Don—Your performance can be enhanced in bed!"
and
"Jake—Your performance can be enhanced in bed!"

and assuming the Yahoo tag line "Find what you need with new enhanced search" was used for feature exclusion, the n-gram 107 corresponding to "enhanced" would reduce the similarity score. However, where n equals eight the falsely excluded n-gram 107 would reduce the number of matching n-grams 107 by only one (inasmuch as spaces are excluded from n-gram 107 formation). In this case, the similarity metric would be reduced from approximately 87% to approximately 86%, and thus the measured similarity would not be materially affected. Although excessive feature exclusion can in theory have such negative consequences even with larger values of n, it is expected that in practical applications it should not be materially affect the measured similarity.

It is to be understood that the usefulness of feature exclusion is not limited to tag lines inserted by Internet Service Providers, nor even to text in messages. Machine-generated artifacts 115 similar to these can be found in a variety of data formats other than just text, such as graphical identifiers and logos, common sequences of formatting commands or common color palettes in images.

An alternative approach to feature selection would be to eliminate artifacts 115 based on a set of patterns (e.g., regular expressions) or fixed strings. However, looking for fixed strings is very inflexible, as the slightest variation from a fixed string results in the artifact 115 not being recognized as such. This can be overcome by including various additional similar strings with minor variations, but this approach becomes unworkable beyond a very limited set of variations.

A pattern would also allow for variations of the artifacts 115 identified in a message 103. However, the processing time required to perform such comparisons increases with the number of patterns. Therefore, this becomes unworkable if a large number of such patterns need to be recognized. The approach outlined above in conjunction with FIG. 1 allows for identifying artifacts 115 to be excluded using a fixed amount of processing time, regardless of the number of artifacts 115 which are defined.

As will be understood by those familiar with the art, the invention may be embodied in other specific forms without departing from the spirit or essential characteristics thereof. Likewise, the particular naming and division of the modules, agents, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for identifying spam email messages, the method comprising the steps of:
   tokenizing an email message into a collection of overlapping n-grams;
   comparing the collection of n-grams to n-grams of known artifacts found in email messages due to how the email messages were produced and transmitted, wherein the known artifacts comprise machine-generated text artifacts included in the email messages by email service providers;
   removing n-grams that match an n-gram of a known artifact from the collection;
   comparing the remaining n-grams in the collection to n-grams of known spam email messages; and
   determining whether the email message comprises spam based on results of the second comparing step.

2. The method of claim 1 further comprising:
   responsive to a threshold percentage of the remaining n-grams in the collection matching n-grams of a known spam email message, determining that the email message comprises spam.

3. The method of claim 1 further comprising:
   responsive to a threshold percentage of the remaining n-grams in the collection not matching n-grams of any known spam email message, determining that the email message does not comprise spam.

4. The method of claim 1 wherein:
   n comprises an integer greater than 4.

5. The method of claim 1 further comprising:
   creating each n-gram using only a subset of bits comprising each character.

6. The method of claim 1 further comprising:
   inputting the collection of n-grams into a permutation box; and
   utilizing output of the permutation box for comparing, wherein the n-grams to which the output of the permutation box is compared have themselves been passed through the permutation box.

7. The method of claim 1 further comprising:
   inputting the collection of n-grams into a substitution box; and
   utilizing output of the substitution box for comparing, wherein the n-grams to which the output of the substitution box is compared have themselves been passed through the substitution box.

8. The method of claim 1 further comprising:
   isolating a predictable subset of n-grams of the email message; and
   utilizing the isolated predictable subset to compare to pluralities of n-grams of known spam email messages, wherein each plurality of n-grams of a known spam email message itself comprises an isolated predictable subset of the known spam email message.

9. The method of claim 1 wherein the n-grams of the known spam email messages are themselves created by executing at least the tokenizing, first comparing, and removing steps.

10. The method of claim 1 wherein n-grams further comprise character-level n-grams or byte-level n-grams.

11. A non-transitory computer readable storage medium containing an executable computer program product for identifying spam email messages, the computer program product comprising:
program code, when executed by a computer processor, causing the computer processor to tokenize an email message into a collection of overlapping n-grams;
program code, when executed by a computer processor, causing the computer processor to compare the collection of n-grams to n-grams of known artifacts found in email messages due to how the email messages were produced and transmitted, wherein the known artifacts comprise machine-generated text artifacts included in the email messages by email service providers;
program code, when executed by a computer processor, causing the computer processor to remove n-grams that match an n-gram of a known artifact from the collection;
program code, when executed by a computer processor, causing the computer processor to compare the remaining n-grams in the collection to n-grams of known spam email messages; and
program code, when executed by a computer processor, causing the computer processor to determine whether the email message comprises spam based on results of the second comparing step.

12. The computer program product of claim 11 further comprising:
program code, when executed by a computer processor, causing the computer processor to determine, responsive to a threshold percentage of the remaining n-grams in the collection matching n-grams of a known spam email message, that the email message comprises spam.

13. The computer program product of claim 11 further comprising:
program code, when executed by a computer processor, causing the computer processor to determine, responsive to a threshold percentage of the remaining n-grams in the collection not matching n-grams of any known spam email message, that the email message does not comprise spam.

14. The computer program product of claim 11 further comprising:
program code, when executed by a computer processor, causing the computer processor to input the collection of n-grams into a permutation box; and
program code, when executed by a computer processor, causing the computer processor to utilize output of the permutation box for comparing, wherein the n-grams to which the output of the permutation box is compared have themselves been passed through the permutation box.

15. The computer program product of claim 11 further comprising:
program code, when executed by a computer processor, causing the computer processor to input the collection of n-grams into a substitution box; and
program code, when executed by a computer processor, causing the computer processor to utilize output of the substitution box for comparing, wherein the n-grams to which the output of the substitution box is compared have themselves been passed through the substitution box.

16. A computer system for identifying spam email messages, the computer system comprising:
a computer processor for executing computer program instructions; and
a non-transitory computer-readable storage medium having executable computer program instructions tangibly embodied thereon, the executable computer program instructions comprising program instructions, when executed by the computer processor, causing the computer processor to instructions:
tokenize an email message into a collection of overlapping n-grams;
compare the collection of n-grams to n-grams of known artifacts found in email messages due to how the email messages were produced and transmitted, wherein the known artifacts comprise machine-generated text artifacts included in the email messages by email service providers;
remove n-grams that match an n-gram of a known artifact from the collection;
compare the remaining n-grams in the collection to n-grams of known spam email messages; and
determine whether the email message comprises spam based on results of the second comparing step.

17. The computer system of claim 16 wherein the executable computer program instructions further comprises program instructions, when executed by the computer processor, causing the computer processor to:
determine that the email message comprises spam responsive to a threshold percentage of the remaining n-grams in the collection matching n-grams of a known spam email message.

18. The computer system of claim 16 wherein the executable computer program instructions further comprises program instructions, when executed by the computer processor, causing the computer processor to:
determine that the email message does not comprises spam responsive to a threshold percentage of the remaining n-grams in the collection not matching n-grams of any known spam email message.

19. The computer system of claim 16, wherein the n-grams of the known spam email messages are themselves created by executing at least the tokenizing, first comparing, and removing steps.

\* \* \* \* \*

UNITED STATES PATENT AND TRADEMARK OFFICE
CERTIFICATE OF CORRECTION

| | | |
|---|---|---|
| PATENT NO. | : 7,912,907 B1 | Page 1 of 1 |
| APPLICATION NO. | : 11/246876 | |
| DATED | : March 22, 2011 | |
| INVENTOR(S) | : Eli Mantel and Sanford Jensen | |

It is certified that error appears in the above-identified patent and that said Letters Patent is hereby corrected as shown below:

Column 8, line 20, after "processor to" delete "instructions".

Signed and Sealed this
Thirty-first Day of May, 2011

David J. Kappos
*Director of the United States Patent and Trademark Office*